United States Patent
Pratt et al.

[15] 3,692,129
[45] Sept. 19, 1972

[54] LOAD CELL WEIGHING SYSTEMS

[72] Inventors: Chapin A. Pratt, Rutland Town, Vt.; Gilbert A. Godwin, Oakland, N.J.

[73] Assignee: Howe Richardson Scale Company, Clifton, N.J.

[22] Filed: April 12, 1971

[21] Appl. No.: 132,962

[52] U.S. Cl. ............... 177/211, 177/134, 177/164, 73/1 B, 177/DIG. 3
[51] Int. Cl. ....... G01g 3/14, G01g 23/16, G01g 23/37
[58] Field of Search ......... 73/1 B; 177/264, 177, 178, 177/1, 50, 210, 211, 245, 250, 132, 136, 134, 135, 163, 161, 162, DIG. 3, 164

[56] References Cited

UNITED STATES PATENTS

| 2,766,981 | 10/1956 | Lauler et al. | 177/211 |
| 3,166,135 | 1/1965 | Clamp | 177/211 |
| 3,203,223 | 8/1965 | Petrow | 73/1 B |
| 3,173,507 | 3/1965 | Clamp | 177/211 |
| 3,173,508 | 3/1965 | Clamp | 177/132 |
| 3,464,508 | 9/1969 | Engle et al. | 177/211 |

Primary Examiner—Robert S. Ward, Jr.
Attorney—Norris & Bateman

[57] ABSTRACT

An electrical load cell-type weighing system having a plurality of load cells supporting a load-receiving structure and providing electrical potentials, the sum of which is a function of the weight of a load applied to the load-receiving structure. Summing resistor networks directly connect the load cell bridges independently of each other to a summing junction of a single ended operational summing amplifier. The potentials produced by the load cells are algebraically summed at the summing junction. Another disclosed feature pertains to a defective load cell testing circuit comprising a switch for selectively providing a short circuit connection across the output terminals of each load cell bridge to determine whether the load cell is defective. Another feature pertains to a special operational amplifier summing network which selectively provides weight measurements in different units of mass such as pounds and kilograms.

18 Claims, 2 Drawing Figures

PATENTED SEP 19 1972    3,692,129

INVENTORS

Norris & Bateman

LOAD CELL WEIGHING SYSTEMS

FIELD OF INVENTION

This invention relates to weighing systems and particularly to the type of weighing system wherein an electrical signal is developed as a measure of the weight of a load being weighed.

BACKGROUND

Prior to this invention it has been the practice to utilize load cells of the strain gauge type for measuring the weight of a load applied to a load-receiving structure such as a weighing platform or hopper. In some applications the load-receiving structure is supported directly on a plurality of load cells. For example, it is customary to support a weighing platform on an assembly of at least four load cells, with one cell being located at each corner of the platform.

With such multiple load cell systems, the weight of the load applied to the platform or other load-receiving structure is represented by the summation of the load cell output potentials. Therefore, some electrical circuit is required for summing the potentials of the load cells without sacrificing the accuracy of the measurement.

Prior to this invention it was considered important in high accuracy weighing systems to present a very high impedance level to the load cell signal source to keep from overloading the source and to thereby preserve the accuracy of the cell. Presentation of a high impedance level to the load cell source was heretofore customarily accomplished by utilizing an amplifier with a high input impedance and by connecting the amplifier in such a manner that current drain from the load cell signal source would be determined by the input impedance of the amplifier. One type of high input impedance amplifier heretofore used is a premium type differential amplifier.

However, these premium differential amplifiers, which meet the accuracy requirements in relatively high-accuracy weighing systems, are incapable of summing voltages. In addition, they are relatively expensive. Less expensive differential amplifiers, on the other hand, do not meet the accuracy requirements that are needed in many current industrial weighing systems.

As a result, it heretofore has been the practice in multiple load cell systems to utilize the premium type of differential amplifiers mentioned above to provide for accurate weight measurements. But since these premium high impedance input amplifiers are not capable of summing voltages, it has been the custom to connect each load cell output to a high input impedance isolating amplifier, and then to sum the outputs of the high input impedance amplifiers at an operational amplifier. Thus, prior multiple load cell systems utilize as many high input impedance amplifiers as there are load cells in addition to a separate amplifier for summing the voltages to provide a signal voltage representing the weight of the applied load. One example of such a system is described in U.S. Pat. No. 3,464,508 issued on Sept. 2, 1969 to C. E. Engle et al. for Force Transducer Output Measuring System Employing Ratio Technique.

As an alternate to the foregoing type of amplifying circuit, it also has been the custom to connect the load cell bridges in series across the terminals of a high input impedance differential amplifier. This arrangement requires tare and dead load bridges in series with the load cell bridges, thus making adjustments for tare and dead load more difficult as compared with the circuit of this invention.

SUMMARY AND OBJECTS OF INVENTION

A major object of this invention is to reduce the cost of load cell weighing systems by eliminating the need for the above-mentioned relatively expensive high input impedance amplifiers without significantly sacrificing the accuracy of the weight measurement. This is accomplished by utilizing a single ended summing operational amplifier and by independently connecting one or more load cells through a resistor summing network to the summing junction of the amplifier. With this circuit, the output impedance seen by the load cell source will be the resistor summing network or, more particularly, the resistance between the load cell bridge output terminal and the summing junction. Although the value of this resistance is relatively low as compared with the high input impedance of a premium type differential amplifier, it was found that with the circuit of this invention, the current drain from the load cell source was not significantly increased and did not significantly impair the accuracy of the weight measurement.

In accordance with this invention each load cell bridge is connected to a floating power supply, and each load cell output is connected to the amplifier's summing junction directly by a resistor summing network which contains no amplifiers. In multiple load cell systems, the summing resistor network contains a summing resistor and a trimming potentiometer in series. Independent adjustments are provided by the trimming potentiometers to trim the load cell potentials so that the potentials are equal to the summing junction for a given load on the scale.

The summing circuit of this invention thus requires only one amplifier for a multiple load cell system. Furthermore, it exhibits low and stable drift or offset characteristics as well as good linearity.

According to another aspect of this invention, the summing circuit of this invention is constructed to provide weight measurements in different units of mass, such as pounds and kilograms. This is accomplished by providing two summing network branches for each load cell. The summing resistance values in the two branches are so related that one provides weight measurement in one unit of mass, such as pounds, while the other branch provides the weight measurement in a different unit of mass, such as kilograms.

According to still another aspect of this invention, a simplified load cell testing network is incorporated into the circuit for determining whether a load cell in a multiple load cell system. This is essentially accomplished by connecting a switch across the output terminals of each load cell bridge for selectively shorting out the load cell bridge network. These last two features are attainable with the circuit of this invention by virtue of connecting the load cell bridges to the summing junction independently of each other, rather than connecting the load cell bridges in series as was done in prior circuits.

Further objects of this invention will appear as the description proceeds in connection with the appended claims and below-described drawings:

DETAILED DESCRIPTION

Figure 1:
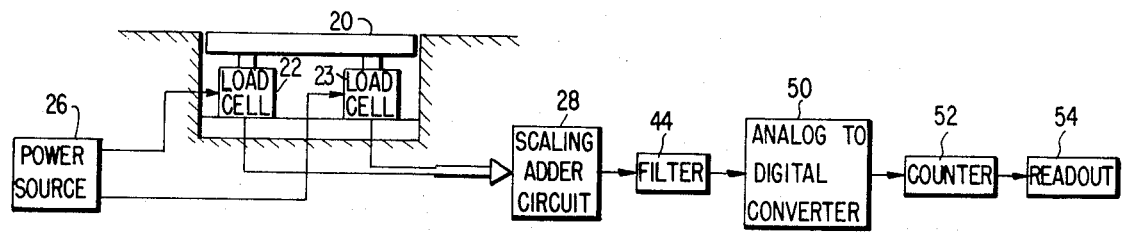
FIG. 1 is a partially functional, schematic diagram of a weighing apparatus according to one embodiment of this invention.

The embodiment shown in FIG. 1 and incorporating the principles of this invention comprises a platform weighing system having a weighing platform 20 and an assembly of load cells (two shown in FIG. 1) 22, 23, 24, and 25 supporting platform 20. Load cells 22–25 are conventionally arranged one at each of the four corners of platform 20, and platform 20 is arranged to receive a vehicle, such as a truck, or a container. Each of the load cells 22–25 is preferably of the conventional silicon or resistance strain gauge type and is excited by a D.C. power supply source indicated at 26.

As will be described in detail shortly, the load-cell developed potentials are summed, tared and amplified by a scaling summer or adder amplifying circuit 28 to provide a D.C. signal voltage whose level is proportional to the weight of the load applied to platform 20. This weight-representing amplified signal voltage at the output of circuit 28 is applied to a filter 44 which filters out any A.C. component that may be superimposed on the D.C. signal. Desirably, filter 44 is of the low pass type having good transient response to a step input to develop a filtered output signal which is substantially free of A.C. components that might interfere with accurate weight measurements.

The amplified and conditioned, load cell-developed signal voltage at the output of filter 44 may be applied to the input of an analog-to-digital converter 50. Converter 50 is of suitable, appropriate form for producing a digital signal that is a function of the level of the weight-representing analog signal voltage applied to the input of the converter. For example, the digital signal may be in the form of a fixed frequency pulse stream or train having a constant pulse repetition rate. The number of pulses in the stream will be proportional to the level of the weight-representing analog signal voltage at a time when the analog signal is sampled.

Thus, by periodically sampling the weight-representing analog signal voltage supplied by filter 44, converter 50 will produce successive weight-representing pulse trains in which the number of pulses in each train will be proportional to the level of the sampled analog signal voltage. The pulses in each weight-representing train are counted in a counter 52, and the count in counter 52 may be transferred to a suitable read-out device 54 for digitally reading out the weight information in printed form, visual form, or both. Alternatively, the weight-representing analog signal voltage supplied by filter 44 may be applied to an analog read-out device. In addition, this weight-representing analog signal voltage may be utilized in controlling the amount of material delivered to a truck or container on the scale platform.

Figure 2:
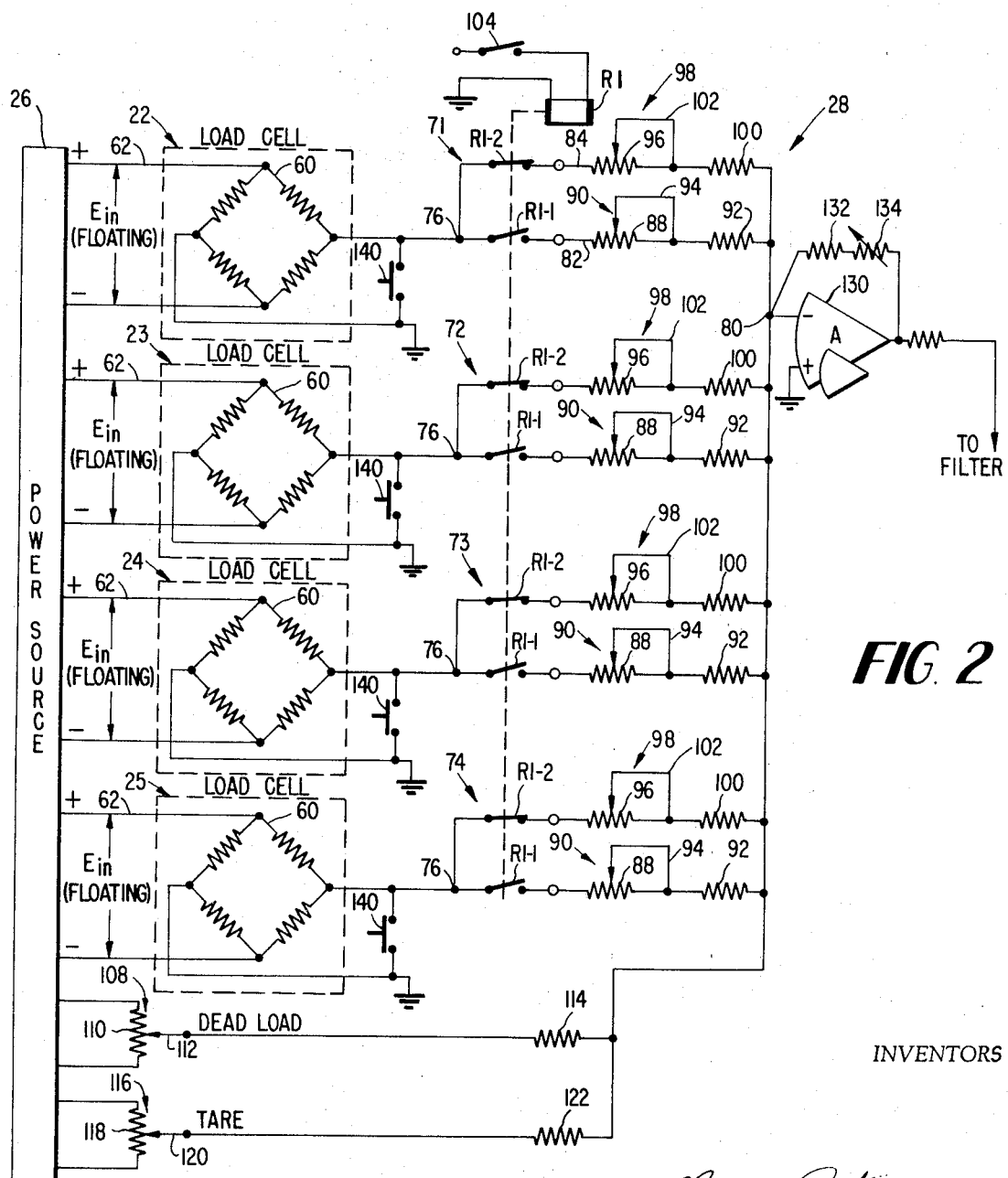
FIG. 2 is a schematic diagram of the load cell network and adder circuit shown in FIG. 1.

As shown in FIG. 2, the four load cells 22–25 are connected in parallel to power supply source 26. Each load cell conventionally comprises a bridge 60 having its two input terminals connected to corresponding output terminals at source 26 as indicated at 62. Each pair of power supply connections 62 to each load cell bridge is a floating input in that the potentials supplied to the load cell bridges are floated above ground and are not fixed with respect to any ground in the system. More particularly, the D.C. output side of source 26 is not tied to ground either internally or to the common of an unshown A.C. source of supply at the input side of source 26. Moreover, the D.C. output side of source 26 is not tied to ground through any hard wire connection, and the D.C. output side is isolated from the unshown ground on the A.C. input side by an isolation transformer. Therefore, the only paths to ground is leakage, stray capacitance and like, or some high resistance. Thus, the power supply potential ($E_{in}$) for each load cell is therefore not fixed with respect to ground and is considered to be a floating drive source for each load cell.

Still referring to FIG. 2, one output terminal of each load cell bridge 60 is connected to ground. The remaining bridge output terminals of load cells 22–25 are respectively connected to the input terminals of summing networks 71, 72, 73 and 74 which form a part of circuit 28.

As shown, each of the networks 71–74 has an input terminal 76 connected to the ungrounded output bridge terminal of its associated load cell and an output terminal connected to an operational amplifier summing point or junction 80.

Network 71 has two parallel circuit branches 82 and 84 connected between its input and output terminals. Branch 82 comprises a set of normally open contacts R1-1 of a relay R1, a resistor 88 of a trimming potentiometer 90 and a summing resistor 92, all connected in series between terminal 76 and junction 80. The moveable wiper of potentiometer 90 is indicated at 94 and is connected to the common junction between resistors 88 and 92.

Circuit branch 84 comprises a set of normally closed contacts R1-2 of relay R1, a resistor 96 of a trimming potentiometer 98 and a summing resistor 100, all connected in series between the input terminal 76 and junction 80. The moveable wiper of potentiometer 98 is indicated at 102 and is connected to the common junction between resistors 92 and 100.

Relay R1 is connected in series with a switch 104 across a suitable power supply source. By selectively closing switch 104, relay R1 is energized to close contacts R1-1 and to open contacts R1-2. Thus by energizing relay R1, circuit branch 82 will be electrically connected into the active circuit and circuit branch 84 will be electrically disconnected from the active circuit. When relay R1 is de-energized by opening switch 104, contacts R1-1 and R1-2 will respectively open and close. As a result, circuit branch 84 will be electrically connected in the active circuit, and circuit branch 82 will be electrically disconnected from the active circuit.

Each of the networks 72–74 is the same as network 71. Accordingly, like reference characters have been applied to designate like components. The normally open contacts R1-1 and normally closed contacts R1-2 in each of the circuits 72–74 are operated by relay R1 as shown, and the operation will be the same as that explained in connection with network 71. The purpose of providing two circuit branches (i.e., branches 82 and 84) in each of the networks 71–74 will be explained later on.

With continued reference to FIG. 2, a dead weight potentiometer 108 has a resistor 110 connected across output terminals at source 26 and a moveable wiper 112 that is adjustable along resistor 110. Wiper 112 is connected through a summing resistor 114 to summing junction 80, as shown.

The load cell assembly output signal voltage applied to junction 80 and the dead weight potentiometer signal voltage applied to junction 80 will be opposite in sign. Wiper 112 is adjusted to offset or tare out the weight of platform 20 and any other scale parts acting on the load cells 22–25 to thereby provide a substantially zero signal voltage condition at the output of circuit 28 when no load is on platform 20. Thus, the signal voltage at the output of circuit 28 will be closely proportional to the load placed on platform 20.

An additional potentiometer 116 is advantageously provided for taring out the weight of a truck or container so as to afford a read-out of the weight of a load in the truck or container. Potentiometer 116 comprises a resistor 118 which may be connected across suitable terminals at source 26. The moveable wiper of potentiometer 116 is indicated at 120 and is connected through a summing resistor 122 to junction 80. The polarity of the signal voltage developed on wiper 120 will also be opposite to that of the load cell assembly output signal voltage at junction 80. Thus, the signal voltage at the output of circuit 28 may selectively be reduced by a magnitude corresponding to the weight of the truck or container on platform 20 by adjusting potentiometer 120. In this manner, circuit 28 can be conditioned to provide an output signal voltage with a level that is proportional to the weight of a load (such as material) placed in a truck on container on platform 20.

As shown in FIG. 2, circuit 28 further comprises an operational summing amplifier 130. As distinguished from a differential amplifier, amplifier 130 is of the single-ended type and is preferably a single ended (at both ends) chopper stabilized amplifier as shown. The inverting input of amplifier 130 is connected to junction 80, and the non-inverting input may be connected to a common ground. The output of amplifier 130 is connected through a resistor to the input of filter 44. A negative feedback is provided by a fixed resistor 132 and a variable resistor 134 which are connected in series between junction 90 and the single ended output of amplifier 130 as shown. Resistor 130 provides a span adjustment for the output of circuit 28.

Selective operation of relay R1 provides for the read-out of the weight of a load on platform 20 either in pounds or in kilograms. To accomplish this, values of resistor 92 and 100 in each of the networks 71–74 are selected so that the ratio of resistor 92 to resistor 100 is substantially equal to the ratio of 1 to 0.454. Thus the read-out of the weight applied to platform 20 will be in terms of pounds when relay R1 is energized. When relay R1 is de-energized, the weight of the load on platform 20 will be read out in terms of kilograms. As one example, the values of resistors 92 and 100 may respectively be 4K and 8.8K.

In the system shown in FIG. 2, potentiometers 90 and 98 are adjusted in each of the networks 71–74 to equalize the potentials of load cells 22–25 at junction 80 for a given load on platform 20. This trimming potentiometer adjustment compensates for the full scale tolerance which strain gauge load cells have at full scale output. By adjusting potentiometers 90–98, the full output potential of load cells 22–25 at junction 80 are made equal to each other for a given load on platform 20. It will be appreciated that the load cell potentials at junction 80 will have the same polarities.

From the foregoing description it will be appreciated that the resulting potential at junction 80 will be virtually ground. The voltage at the output of amplifier 130 will be proportional to the sum of the four load cell potentials applied to junction 80 less the sum of the potentials applied by potentiometers 108 and 116. Equalization of the load cell potentials applied to junction 80 is accomplished by input resistor scaling, and input resistor scaling is achieved by the selective calibrating adjustment of potentiometer 90 and 98 in each of the networks 71–74. The transfer function for the type of circuit shown in FIG. 2 can readily be determined.

According to this invention it was found that by utilizing a single ended operational amplifier in conjunction with floating inputs to the load cell bridges and the load cell bridge connections together with networks 71–74 provide for accurate weight measurements even though the impedance seen by the load cell signal source (e.g., the total active resistance in either branch 82 or branch 84 for load cell 22) is relatively low as compared with the high input impedance of a premium differential amplifier. As a result, the circuit of this invention is less expensive than prior load cell amplifier systems, but yet achieves results that are comparable to prior systems. More particularly, low and stable drift or offset characteristics are achieved with circuit 28. In addition, circuit 28 has good linerity characteristics, and even though impedance seen by each load cell is relatively low, it was found that loads even on the order of 4K did not adversely load down the load cell source. Consequently, there is negligible interaction between load cells 22–25 and amplifier 130.

As shown in FIG. 2, a load cell test switch 140 is connected between the output terminals of each of the load cells 22–25. During normal operation, switches 140 are opened. When one or more of the load cells is suspected of being defective, switches 140 are closed one at a time. By closing each switch 140 it will be appreciated that the switch applies a short circuit connection across the output terminals of its associated load cell bridge. This short circuit connection will remove from junction 80 any signal voltage that the cell was applying to the summing junction.

Preferably, but not necessarily, the weighing system is checked or pre-tested, when it is operating properly and without malfunction to provide measurements that may be compared with later measurements obtained from defective load cell tests utilizing switches 140. In this pre-test procedure each switch 140 is closed, one at a time, leaving the remaining switches open. As each switch 140 is closed, it will remove from junction 80 the signal voltage of its associated load cell by shorting out the load cell bridge. Thus, the signal voltage at the output of amplifier 130 and hence the read-out at device 54 will decrease by a magnitude equivalent to the potential originally supplied by the load cell before it was shorted. These measurements are recorded for comparison with later tests in which switches 140 are used to detect and locate a defective load cell. In addition, combinations of two, three and four of the load cell bridges may be shorted out together to provide additional comparative measurements. Possible defective load cell conditions may be manifested in a number of ways. First, the read-out of a weight of a load applied to platform 20 may deviate significantly from the estimated weight of the applied load. Second, the output of amplifier 130 may be very high in a positive or negative direction or even saturated, causing the read-out to go very high or even to full scale value. Any one of the foregoing conditions may be the result of one or more defective load cells.

Assume now that the first of the above-mentioned conditions is manifested. To check the load cells, switches 140 are selectively closed one at a time leaving the remaining switches open. Taking load cell 22 first, the closure of the associated testing switch 140 will remove any signal voltage that load cell 22 way applying to junction 80. If there is a reduction in the output of amplifier 139 and if the reduction corresponds to the reduction achieved during the above-mentioned pre-test procedure, the results indicate that load cell 22 is in satisfactory working order. But if there is no change in the amplifier output when the testing switch 140 is closed for load cell 22, the results indicate that load cell 22 is defective. Such a condition could be the consequence of an unbonded strain gauge at load cell 22.

Each of the other load cells 23–25 may be tested in the foregoing manner, and combinations may be tested comparing the read-out results with those obtained during the pre-test procedure.

Assume now that the defective condition is causing a very high positive or negative output at amplifier 130. The previously mentioned testing procedure is followed, and load cell 22 will be taken as an example. If the output of amplifier 130 returns to a normal range when the testing switch 140 for load cell 22 is closed, such results indicate that load cell 22 is defective. Such results may be the consequence of a broken leg in the load cell bridge.

It will be appreciated that the load cell testing switch arrangement described above is readily applicable to a single load cell system which is the same as the above-described multiple load cell system, except that only one load cell is utilized and is connected, for example, to a platform supporting lever mechanism. For such a system, the conditions indicating that the system is functioning improperly are essentially the same as those described for the multiple load cell system.

For a single load cell system, there may be no significant output at the read-out, or the output may be very high in either a positive or negative sense. Assume that there is no significant read-out when a load is applied to the scale. If there is no change in the output voltage of amplifier 130 when the testing switch is closed to short out the load cell bridge, then such results indicate that the load cell is defective. As previously mentioned such a defect may be an unbonded strain gauge.

Still considering the single load cell system, assume now that the amplifier output is very high or saturated. If the amplifier output reduces to a normal range or more particularly reduces to a negative value proportional to the settings of potentiometers 108 and 116, then such results indicate that the load cell is defective. Such results may be caused by a broken leg in the load cell bridge.

For the circuit shown in FIG. 2 it is important that the power supply potentials to the load cell bridges be floating in the manner previously described. If the power supply were not floating one leg of each load cell bridge would effectively be shorted out to objectionally alter the characteristics of the load cell.

From FIG. 2 it also will be appreciated that the load cell bridges are connected to summing junction 80 independently of each other and only through resistors in the summing networks. This circuitry enables the use of the load cell testing arrangement and the alternate weight measurements in a plurality of different units of mass.

Although the circuit of his invention is described in connection with a platform weighing system in the illustrated embodiment, it will be appreciated that this invention is equally applicable to any type of load cell weighing system. For example, the circuit of this invention is applicable to weighing apparatus in which a hopper is the load-receiving structure.

What is claimed and desired to be secured by Letters Patent is:

1. In a weighing system, a structure for receiving a load to be weighed, a plurality of load cells supporting said structure and being operative to develop a corresponding plurality of potentials, the sum of said potentials being a function of the weight of the load applied to said platform, a single ended operational summing amplifier, signal utilization means operatively connected to the output of said amplifier, a summing junction connected to an input terminal of said amplifier, a summing resistor network independently connecting each of the load cells to said summing junction for applying the load cell-developed potentials to said junction without amplification, and feedback means connected between said junction and the output of said amplifier and cooperating with said amplifier to provide at the output of said amplifier an electrical signal with a value that is a function of the algebraic summation of the signals applied to said summing junction.

2. The weighing system defined in claim 1 wherein each load cell includes a bridge circuit having a pair of input terminals and a pair of output terminals, power source means for applying a D.C. potential across the input terminals of each load cell bridge circuit, the potentials applied to the input terminals of said bridge circuits being floating with respect to a source of reference potential, said amplifier having an inverting input terminal connected to said summing junction and a non-inverting input terminal connected to said source of reference potential.

3. The weighing system defined in claim 2 wherein each summing resistor network comprises a summing resistor connected between one output terminal of its associated load cell bridge circuit and said summing junction, and wherein the other output terminal of each load cell bridge circuit is connected to said source of reference potential.

4. The weighing system defined in claim 3 wherein means are provided for selectively providing a short circuit path across the output terminals of each load cell bridge circuit.

5. The weighing system defined in claim 3 wherein a selectively actuatable switch is provided for each of said load cell and is connected between the output terminals of its associated load cell bridge circuit, each of the switches being selectively actuatable to provide a short circuit path across the output terminals of its associated load cell bridge circuit.

6. The weighing system defined in claim 2 wherein each summing resistor network comprises a summing resistor and a load cell trimming potentiometer connected in series between one output terminal of its associated load cell bridge circuit and said summing junction.

7. The weighing system defined in claim 2 wherein each summing resistor network comprises a pair of summing resistors and selectively actuatable means for alternatively connecting said summing resistors in the active circuit between said summing junction and one output terminal of the associated one of said load cell bridge circuits to provide a current path between said one output terminal and said summing junction, said summing resistors respectively having different pre-selected values that respectively provide for the read-out of the weight of said load in terms of two different pre-selected units of mass.

8. The weighing system defined in claim 2 comprising means in each summing resistor network for selectively altering the summing resistor value between each bridge circuit and said summing junction to alternatively provide for the read-out of the weight of said load in different pre-selected units of mass.

9. In a weighing system, a structure for receiving a load to be weighed, at least one load cell having a bridge circuit, said bridge circuit having a pair of input terminals and a pair of output terminals, means for applying a potential across said input terminals, said load cell being operatively associated with said structure to develop a potential across said output terminals that is a function of the weight of a load applied to said structure, and means for selectively providing a short circuit across said output terminals.

10. The weighing system defined in claim 9 including amplifier means and signal utilization means connected to the output of said amplifier means, and means for applying the potential at said output terminals to the input circuit of said amplifier means.

11. The weighing system defined in claim 9 including an operational amplifier, a summing junction connected to the input of said amplifier, signal utilization means connected to the output of said amplifier, one of said output terminals being connected to said summing junction and the other of said output terminals being connected to a source of reference potential.

12. The weighing system defined in claim 11 wherein said means for providing a short circuit across said output terminals comprises a selectively actuatable switch.

13. In a weighing system, a structure for receiving a load to be weighed, a plurality of load cells supporting said structure and each having a bridge circuit, each bridge circuit having a pair of input terminals and a pair of output terminals, means for applying a potential across the input terminals of each bridge circuit, and said load cells being operative to respectively develop potentials across their output terminals, the sum of said potentials being a function of the weight of the load applied to said structure, an operational amplifier, signal utilization means connected to the output of said amplifier, a summing junction connected to the input of said amplifier, means for connecting said bridge circuits to said summing junction independently of each other and including summing resistor means connected between one output terminal of each bridge circuit and said summing junction, and means for selectively providing a short circuit across the output terminals of each bridge circuit to remove the potential applied by each bridge circuit to said summing junction independently of the potentials applied by each of the other bridge circuits.

14. The weighing system defined in claim 13 wherein said short circuit providing means comprises a switch connected across the output terminals of each bridge circuits, said switches being selectively actuatable independently of each other to establish the short circuits across the associated pairs of bridge circuit output terminals.

15. The weighing system defined in claim 13 wherein the other of said output terminals of each pair of output terminals is connected to a source of reference potential.

16. In a weighing system, a structure for receiving a load to be weighed, at least one load cell operatively connected to said structure for developing a D.C. output potential that is a function of the weight of a load applied to said structure, an operational amplifier, a summing junction connected to the input of said amplifier, a summing resistor network electrically connecting said load cell to said summing junction, signal read-out means, means electrically connecting the output of said amplifier to said read-out means to provide for the read-out of the weight of the applied load under the control of the potential at the output of said amplifier, and means in said network for selectively altering the summing resistor value between said load cell and said summing junction to alternately provide for the read-out of the weight of the applied load at said read-out means in a plurality of different pre-selected units of mass.

17. The weighing system defined in claim 16 wherein said network comprises a pair of summing resistors respectively having different pre-selected values to respectively provide for the read-out of the weight of said load in two different preselected units of mass at said read-out means, and wherein said selectively actuatable means is actuatable to alternatively connect said resistors in the active circuit between said load cell and said summing junction to provide a current path therebetween.

18. The weighing system defined in claim 16 wherein said network comprises a pair of separate circuit branches respectively having first and second summing resistors, said summing resistors respectively having different pre-selected values that respectively provide for the read-out of the weight of said load in two different pre-selected units of mass, and wherein said selectively actuatable means comprises switching means in each of said branches for alternatively connecting said summing resistors in an active circuit between said load cell and said summing junction to provide a current path through the one of the summing resistor in the active circuit for thereby applying the load cell output potential to said summing junction.

* * * * *